US012577510B2

United States Patent

(12) United States Patent
Orf et al.

(10) Patent No.: US 12,577,510 B2
(45) Date of Patent: Mar. 17, 2026

(54) DRYER SHEET AND PROCESS OF MAKING

(71) Applicant: The Procter & Gamble Company, Cincinnati, OH (US)

(72) Inventors: Emmy Holland Orf, Mason, OH (US); Michael Paul Fontaine, Springboro, OH (US); Ahmadreza Ghobadi, Loveland, OH (US); Johan Smets, Lubbeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 298 days.

(21) Appl. No.: 18/361,466

(22) Filed: Jul. 28, 2023

(65) Prior Publication Data

US 2025/0034489 A1 Jan. 30, 2025

(51) Int. Cl.
*C11D 17/00* (2006.01)
*C11D 3/00* (2006.01)
(Continued)

(52) U.S. Cl.
CPC ............ *C11D 17/047* (2013.01); *C11D 3/001* (2013.01); *C11D 3/126* (2013.01); *C11D 3/2079* (2013.01);
(Continued)

(58) Field of Classification Search
CPC ....... C11D 17/047; C11D 3/001; C11D 3/126; C11D 3/2079; C11D 3/349; C11D 3/3715;
(Continued)

(56) References Cited

U.S. PATENT DOCUMENTS

2004/0167056 A1* 8/2004 Lentsch ................ D06M 23/02 510/515
2016/0089464 A1 3/2016 Frankenbach et al.
(Continued)

FOREIGN PATENT DOCUMENTS

JP 2837042 B2 * 12/1998 ........... C11D 17/047
WO WO 2018169531 A1 * 9/2018 ......... C11D 17/0039
(Continued)

OTHER PUBLICATIONS

EPO Search Report and Opinion for 24186466.9 dated Dec. 23, 2024, 12 pages.

*Primary Examiner* — Eisa B Elhilo
(74) *Attorney, Agent, or Firm* — Carolyn S. Powell; Gary J. Foose

(57) ABSTRACT

A dryer sheet including: a nonwoven fibrous substrate; a fabric softener composition engaged with the nonwoven fibrous layer, wherein the fabric softener composition includes: a fabric softening active; a clay; and delivery particles including a core and a polymer wall surrounding the core; wherein the core includes: a benefit agent; and about 5% to about 55% partitioning modifier by weight of the of core; wherein the polymer wall includes a (meth) acrylate polymer derived, at least in part, from one or more oil-soluble or oil-dispersible multifunctional (meth)acrylate monomers or oligomers, the one or more oil-soluble or oil-dispersible multifunctional (meth)acrylate monomers or oligomers having at least three radical polymerizable functional groups, wherein at least one of the radical polymerizable groups is acrylate or methacrylate, wherein the core and the polymer wall are present at a weight ratio of from about 96:4 to about 99.5:0.5.

19 Claims, 1 Drawing Sheet

(51) Int. Cl.

| | |
|---|---|
| ***C11D 3/12*** | (2006.01) |
| ***C11D 3/20*** | (2006.01) |
| ***C11D 3/34*** | (2006.01) |
| ***C11D 3/37*** | (2006.01) |
| ***C11D 3/50*** | (2006.01) |
| ***C11D 17/04*** | (2006.01) |

(52) U.S. Cl.
CPC ............ *C11D 3/349* (2013.01); *C11D 3/3715* (2013.01); *C11D 3/3761* (2013.01); *C11D 3/505* (2013.01); *C11D 2111/12* (2024.01)

(58) Field of Classification Search
CPC ... C11D 3/3761; C11D 3/505; C11D 2111/12; C11D 3/2093; C11D 17/06
USPC .......................................................... 510/516
See application file for complete search history.

(56) References Cited

U.S. PATENT DOCUMENTS

| | | | | |
|---|---|---|---|---|
| 2019/0233786 | A1* | 8/2019 | Panandiker .............. | D06B 1/08 |
| 2019/0367850 | A1* | 12/2019 | Panandiker .......... | C11D 17/047 |
| 2022/0396750 | A1* | 12/2022 | Smets .................... | A01N 25/28 |
| 2023/0120922 | A1 | 4/2023 | Smets et al. | |
| 2024/0328844 | A1 | 10/2024 | Lester | |
| 2024/0328845 | A1 | 10/2024 | Lester | |

FOREIGN PATENT DOCUMENTS

| | | | | |
|---|---|---|---|---|
| WO | WO 2022081958 | * | 4/2022 | ............. C11D 3/505 |
| WO | WO 2022082191 A1 | * | 4/2022 | ............. C11D 3/505 |

* cited by examiner

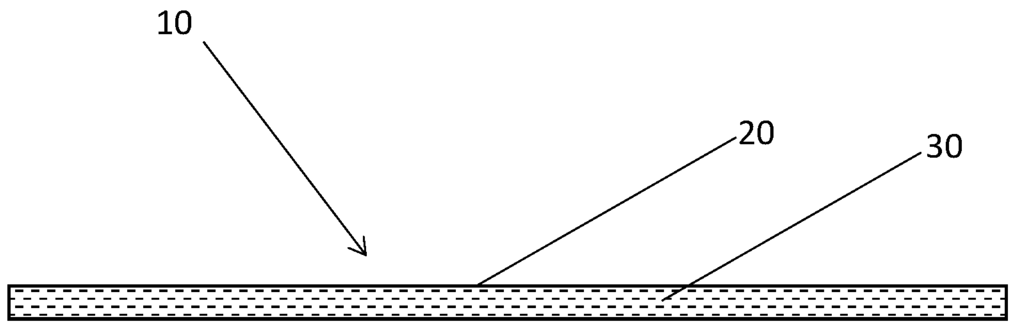
10
20
30

DRYER SHEET AND PROCESS OF MAKING

FIELD OF THE INVENTION

Dryer sheets for use in a tumble dryer.

BACKGROUND OF THE INVENTION

Dryer sheets are commonly employed in automatic laundry drying machines to provide softening, anti-static, scent, and other benefits to garments and other textiles. Many benefit agents can be carried on dryer sheets within delivery particles. The delivery particles contain the benefit agent after manufacture of the delivery particles until the dryer sheet is used in a dryer. When the dryer sheet is used in a dryer, the delivery particle is deposited on the garment or other textile being dried.

Delivery particles that include the benefit agent in a core that is contained within a polymer wall can be particularly useful. Once such delivery particles are deposited on a garment or other textile, the garment or other textile carries the benefit agent which can be released upon the delivery particles being ruptured. The delivery particles can rupture as a result of pressure or shear applied to the delivery particle during wear or use of the garment or other textile.

Delivery particles that comprise a core contained within a (meth)acrylate polymer wall have been demonstrated to be able to efficiently contain various benefit agents and a broad palette of Perfume Raw Materials (PRMs). However, such delivery particles have been determined to be difficult to employ in a melt of fabric softener composition that is applied to a nonwoven substrate to form dryer sheets. Delivery particles that comprise a core contained within a (meth)acrylate polymer wall are manufactured by a process in which the end result is a water based slurry of delivery particles. A melt comprising the fabric softening active and the slurry of delivery particles can be difficult to employ in the manufacture of dryer sheets because aggregations of material form in the melt. The aggregations can complicate applying the melt to the nonwoven fibrous layer and transporting the combination of the nonwoven fibrous layer and the fabric softener composition through the converting process.

With these limitations in mind, there is a continuing unaddressed need for dryer sheets that include disaggregated delivery particles that contain a benefit agent within a polymer wall.

SUMMARY OF THE INVENTION

A dryer sheet comprising: a nonwoven fibrous substrate; a fabric softener composition engaged with said nonwoven fibrous layer, wherein said fabric softener composition comprises: a fabric softening active; a clay; and delivery particles comprising a core and a polymer wall surrounding said core; wherein said core comprises: a benefit agent; and about 5% to about 55% partitioning modifier by weight of said of core; wherein said polymer wall comprises a (meth)acrylate polymer derived, at least in part, from one or more oil-soluble or oil-dispersible multifunctional (meth)acrylate monomers or oligomers, said one or more oil-soluble or oil-dispersible multifunctional (meth)acrylate monomers or oligomers having at least three radical polymerizable functional groups, wherein at least one of said radical polymerizable groups is acrylate or methacrylate, wherein said core and said polymer wall are present at a weight ratio of from about 96:4 to about 99.5:0.5; and wherein said delivery particles are characterized by a volume-weighted median particle size from about 30 to about 50 microns.

BRIEF DESCRIPTION OF THE DRAWINGS

FIG. 1 is a dryer sheet comprising a nonwoven fibrous substrate and a fabric softener composition.

DETAILED DESCRIPTION OF THE INVENTION

Nonwoven Fibrous Substrate

Nonwoven fibrous substrates provide for adequate function as a carrier of fabric softener compositions. Fabric softener compositions comprise fabric softening actives. The nonwoven fibrous substrate can be a polyester nonwoven fibrous substrate. For example, the nonwoven fibrous substrate can be polyester terephthalate. The nonwoven fibrous substrate can be a spun bonded polyester terephthalate. Optionally, the nonwoven fibrous substrate can be continuous filament spun bonded polyester terephthalate. Other nonwoven fibrous substrates, such as rayon, can also be practical.

The nonwoven fibrous substrate can have a basis weight from about 10 $g/m^2$ to about 50 $g/m^2$. Such fibrous substrates have sufficient constitution to carry the desired quantity of fabric softener composition. To provide for the desired release of the fabric softener composition, the nonwoven fibrous substrate can have a permeability of from about 50 Darcys to about 150 Darcys, optionally about 90 Darcys to about 140 Darcys. The fibers constituting the nonwoven fibrous substrate can have a denier from about 2 to about 6. The nonwoven fibrous substrate can have a caliper from about 0.1 mm to about 0.5 mm, or optionally from about 0.1 mm to about 0.4 mm. The greater the caliper, the more space within the nonwoven fibrous substrate to hold fabric softener composition. The nonwoven fibrous substrate can have a basis weight from about 10 $g/m^2$ to about 40 $g/m^2$, optionally, from about from about 12 $g/m^2$ to about 20 $g/m^2$.

The nonwoven fibrous substrate can be a continuous filament of polyester homopolymer and binder filaments formed of a polyester copolymer. The nonwoven fibrous substrate can be a polyolefin nonwoven. The nonwoven fibrous substrate can be spunbonded nonwoven. The nonwoven fibrous substrate can be an area bonded or point bonded nonwoven. The nonwoven fibrous substrate can be a spun bonded polyethylene terephthalate having trilobal fibers having a denier from about 5 to about 6. The nonwoven fibrous substrate can be a spun bonded a bicomponent fiber having a polyethylene terephthalate core and copolyethylene terephthalate with isophthatlate and or mixture thereof.

The nonwoven fibrous substrate can comprise bicomponent fibers. The bicomponent fibers can be core-sheath constructions or lobed constructions. The nonwoven fibrous substrate can comprise bicomponent fibers that are polyethylene/polyethylene terephthalate core-sheath constructions, with either constituent forming the core or sheath. The bicomponent fibers can be polyethylene/polypropylene, with either constituent forming the core or sheath.

The nonwoven fibrous substrate can be the nonwoven fibrous substrate used presently or in the past or like that used presently or in the past in BOUNCE dryer sheets, available from The Procter & Gamble Company, Cincinnati, OH, United States of America, SNUGGLE dryer sheets, available from Henkel Corporation, Stamford, Connecticut, United States of America, and or SUAVITEL dryer sheets, available from Colgate-Palmolive Company, New York, New Yok, United States of America. The nonwoven fibrous substrate can be cellulose.

Fabric Softener Composition

The fabric softener composition can comprise a fabric softening active, a clay, and delivery particles comprising a core and a polymer wall surrounding the core. The fabric softener composition can comprise from about 50% to about 65%, by weight of said fabric softener composition, fabric softening active. The fabric softening active can be a quaternary ammonium compound. The fabric softener composition can comprise from about 10% to about 90% quaternary ammonium compound, by weight of the fabric softener composition. The quaternary ammonium compound can be ester and or amide linked. The fabric softening active can be a branched polyester.

The fabric softener composition can comprise clay at a level from about 6% to about 10% weight percent, by weight of the fabric softener composition.

The fabric softener composition can comprise from about 0.2% to about 2%, by weight of the fabric softener composition, delivery particles.

The fabric softener composition can comprise a variety of adjuncts. The fabric softener composition may comprise unencapsulated perfume. The fabric softener composition can comprise from about 0.1% to about 5%, by weight of the fabric softener composition, unencapsulated perfume.

The fabric softener composition can comprise adjuncts selected from the group consisting of softening agents, soil release agents, anti-static agents, crisping agents, water/stain repellents, stain release agents, refreshing agents, disinfecting agents, wrinkle resistant agents, wrinkle release agents, odor resistance agents, malodor control agents, abrasion resistance and protection agents, solvents, insect/pet repellents, wetting agents, chlorine scavenging agents, optical brighteners, UV protection agents, skin/fabric conditioning agents, skin/fabric nurturing agents, skin/fabric hydrating agents, color protection agents, dye fixatives, dye transfer inhibiting agents, silicones, preservatives and anti-microbials, fungicides, fabric shrinkage-reducing agents, brighteners, hueing dyes, bleaches, chelants, antifoams, anti-scum agents, whitening agents, catalysts, cyclodextrin, zeolite, petrolatum, glycerin, triglycerides, vitamins, other skin care actives such as aloe vera, chamomile, shea butter and the like, mineral oils, and combinations thereof.

Fabric Softening Actives

The dryer sheets can comprise a fabric softener composition that comprises a fabric softening active. The fabric softening active can be the fabric softening active used presently or in the past or like that used presently or in the past in BOUNCE dryer sheets, available from The Procter & Gamble Company, Cincinnati, OH, United States of America, SNUGGLE dryer sheets, available from Henkel Corporation, Stamford, Connecticut, United States of America, and or SUAVITEL dryer sheets, available from Colgate-Palmolive Company, New York, New Yok, United States of America.

The fabric softening active can be a quaternary ammonium compound. The quaternary ammonium compound can be ester and or amide linked. Optionally, the iodine value of the parent fatty acid from which the quaternary ammonium compound is formed can be from about 25 to about 50, optionally from about 30 to about 48, optionally from about 32 to 45. Optionally, the parent fatty acid from which the quaternary ammonium compound is formed can comprise from about 2 to about 20 percent by weight of the total fatty acid chains double unsaturated C18 chains.

The fabric softening active can be:

$$\{R2(4-m)-N+-[X-Y-R1]m\}A-$$

wherein: m is 1, 2 or 3 with proviso that the value of each m is identical; each R1 is independently hydrocarbyl, or branched hydrocarbyl group, preferably R1 is linear, more preferably R1 is partially unsaturated linear alkyl chain; each R2 is independently a C1-C3 alkyl or hydroxyalkyl group, preferably R2 is selected from methyl, ethyl, propyl, hydroxyethyl, 2-hydroxypropyl, 1-methyl-2 hydroxyethyl, poly(C2-C3¬ alkoxy), polyethoxy, benzyl; each X is independently —(CH2)n-, —CH2-CH(CH3)- or —CH—(CH3)-CH2- and each n is independently 1, 2, 3 or 4, preferably each n is 2; each Y is independently —O—(O)C— or —C(O)—O—; A- is independently selected from the group consisting of chloride, methyl sulfate, and ethyl sulfate, preferably A- is selected from the group consisting of chloride and methyl sulfate, more preferably A is methyl sulfate; with the proviso that when Y is —O—(O)C—, the sum of carbons in each R1 is from 13 to 21, optionally from 13 to 19. Optionally, X is —CH2-CH(CH3)- or —CH—(CH3)-CH2- to improve the hydrolytic stability of the quaternary ammonium ester softening active, and hence further improve the stability of the fabric softener composition. Examples of suitable quaternary ammonium ester softening actives are commercially available from Evonik under the tradename Rewoquat WE18, Rewoquat WE20, from Stepan under the tradename Stepantex GA90, Stepantex VK90, Stepantex VL90A. These types of agents and general methods of making them are disclosed in U.S. Pat. No. 4,237,180.

The fabric softening active can comprise a cationic nitrogen-containing compound such as a quaternary ammonium compound having one or two straight-chain organic groups of at least 8 carbon atoms; optionally one or two such groups of from 12 to 22 carbon atoms and, optionally be ester and or amide linked. Specific non-limiting examples of fabric softening actives include the following: Di Tallow, Di Methyl Ammonium Methyl Sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di (2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri(oleyl-oxy-ethyl)-N-methyl ammonium chloride, N,N,N-tri(canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof. The fabric softening active can be N,N-di(tallowyl-oxy-ethyl)-N-methyl, N-(2-hydroxyethyl) ammonium methyl sulfate.

The fabric softening active may comprise ingredients such as a nonionic material. Suitable nonionic materials may include polyoxyalkylene glycols, higher fatty alcohol esters of polyoxyalkylene glycols, higher fatty alcohol esters of polyoxyalkylene glycols, ethoxylates of long chained alcohols of from 8 to 30 carbon atoms such as the ethoxylates of coconut, palm, tallow alcohols or hydrogenated alcohols with 4 to 40 moles of ethylene oxide, and alkanolamides. The fabric softening active may further comprise, with or without a non-ionic material, fatty acids, ethoxylated fatty acids, and combinations thereof. Suitable fatty acids include those wherein the long chain is unsubstituted or substituted alkyl or alkenyl group of from about 8 to 30 carbon atoms. Examples of specific fatty acids are lauric, palmitic, stearic, oleic, and/or combinations thereof. The fabric softener composition can comprise from about 25% to about 35%, by weight of the fabric softener composition, fatty acid. The fabric softener composition can contain less than about 5% by weight of fatty acid, by weight of the fabric softener composition.

The fabric softening active can comprise one or more organic compounds having at least one relatively long hydrocarbon group serving to provide lubricity and or antistatic effects. Among such groups are alkyl groups containing 8 or more carbon atoms or even 12 to 22 carbon atoms. Suitable fabric softener compositions can comprise cationic, anionic, nonionic, or zwitterionic compounds. Cationic nitrogen containing compounds such as quaternary ammonium compounds having one or two straight chain organic groups of at least eight carbon atoms are practical.

The fabric softening active can be selected from the group consisting of polyglyceryl distearate, parrafin wax, branched paraffin wax, polyglyceryl ethers, and combinations thereof.

Suitable fabric softening actives include cationic, anionic, nonionic, or zwitterionic compounds. The fabric softening active can be a quaternary imidazolinium salt. Optionally, the fabric softening active can be a polyoxyalkylene glycol, including higher fatty alcohol esters of polyoxyalkylene glycol and higher fatty alcohol ethers of polyoxyalkylene glycol. The fabric softening active can be a fatty acid ester of sorbitan and ethoxylates of such esters.

The fabric softening active can be a branched polyester having a formula of:

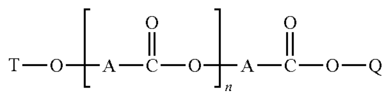

wherein: each A is independently a branched hydrocarbon chain comprising 4 to 100 carbon atoms; Q is selected from an alkyl chain comprising 1 to 30 carbon atoms and a hydrogen atom; T is a hydrogen atom or a —C(O)—R wherein each R is an alkyl chain comprising 1 to 30 carbon atoms and n is an integer from 1 to about 100.

Optionally, each A can be independently a branched hydrocarbon chain comprising from 4 to 40 carbon atoms; Q can be selected from an alkyl chain comprising 1 to 30 carbon atoms and a hydrogen atom; T can be a hydrogen atom or a —C(O)—R wherein each R can be an alkyl chain comprising from 7 to 21 carbon atoms; and n can be an integer from 4 to 40.

Optionally, the branched polyester polymer can have a weight average molecular weight of from about 500 g/mol to about 100,000 g/mol.

Optionally, each A of the polyester polymers can be independently a branched hydrocarbon having the structure:

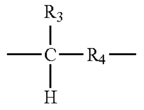

wherein each $R_3$ can be a monovalent alkyl or substituted alkyl group and $R_4$ can be an unsaturated or saturated divalent alkylene radical comprising from 1 to about 24 carbon atoms.

Optionally, each A of the polyester polymers can have the structure:

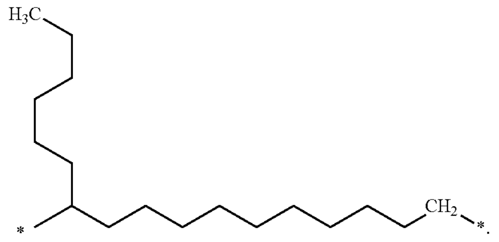

Clay

The dryer sheets can comprise a fabric softener composition that comprises a clay. The clay can be bentonite. The clay can be sodium bentonite, calcium bentonite, or a mixture thereof.

Delivery Particles

Delivery particles can be provided following the teaching of US20230120922A1.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth) acrylate, and various multifunctional(meth)acrylates. Monofunctional (meth)acrylates, i.e., those containing only one (meth)acrylate group, may also be advantageously used. Typical mono(meth)acrylates include 2-ethylhexyl (meth) acrylate, 2-hydroxyethyl (meth)acrylate, cyanoethyl (meth) acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

For ease of reference in this specification and in the claims, the term "monomer" or "monomers" as used herein with regard to the polymer wall is to be understood as monomers but also is inclusive of oligomers or monomers, and prepolymers formed of the specific monomers.

Unless otherwise noted, all component or composition levels are in reference to the active portion of that component or composition, and are exclusive of impurities, for example, residual solvents or by-products, which may be present in commercially available sources of such components or compositions.

The compositions and products of the present disclosure comprise populations of delivery particles. The fabric softener composition may comprise from about 0.05% to about 20%, or from about 0.05% to about 10%, or from about 0.1% to about 5%, or from about 0.2% to about 2%, by weight of the composition, of delivery particles. The fabric softener composition may comprise a sufficient amount of delivery particles to provide from about 0.05% to about 10%, or from about 0.1% to about 5%, or from about 0.1% to about 2%, by weight of the fabric softener composition, of perfume to the fabric softener composition. When discussing herein the amount or weight percentage of the delivery particles, it is meant the sum of the polymer wall material and the core material.

The delivery particles typically comprise a core and a polymer wall, where the polymer wall envelopes or contains the core. As described in more detail below, the core may include a benefit agent and optionally a partitioning modifier, and the polymer wall may comprise certain polymers, namely an acrylate material.

The delivery particles may have a volume weighted median particle size of from about 30 to about 50 microns, optionally from about 30 to about 40 microns.

The population of delivery particles may have a relatively wide distribution of particle sizes. As mentioned above it is believed that a wide distribution contributes to the compositions being more effective on various types of fabrics or garments. The population of delivery particles may be characterized by a Broadness Index, which is a way of characterizing the size distribution.

The Broadness Index is calculated by determining the particle size at which 90% of the cumulative particle volume is exceeded (90% size), the particle size at which 5% of the cumulative particle volume is exceeded (5% size), and the median volume-weighted particle size (50% size; where 50% of the particle volume is both above and below this size). The values can be used in the following equation to determine the Broadness Index for a population of delivery particles.

Broadness Index=(90% size−5% size)/50% size

The population of delivery particles of the present disclosure may be characterized by a Broadness Index of at least 1.0, optionally at least 1.1, optionally at least 1.2. The population of delivery particles may be characterized by a Broadness Index of from about 1.0 to about 2.0, or from about 1.0 to about 1.8, or from about 1.1 to about 1.6, or from about 1.1 to about 1.5, or from about 1.2 to about 1.5, or from about 1.2 to about 1.4. Relatively higher Broadness Index values indicate a relatively wider particle size distribution.

The population of delivery particles may be characterized by one or more of the following: (i) a $5^{th}$-percentile volume-weighted particle size of from about 1 micron to about 15 microns; (ii) a $50^{th}$-percentile (median) volume-weighted particle size of from about 30 microns to about 50 microns; (iii) a 90'-percentile volume-weighted particle size of from about 40 microns to about 80 microns; or (iv) a combination thereof.

As described in more detail below, the delivery particles of the present disclosure comprise a core and a polymer wall surrounding the core. Selecting, among other things, particular ratios of core material to polymer wall material can result in populations of delivery particles that show improved performance. Delivery particles with a high core:polymer wall ratio can deliver a benefit agent more efficiently, requiring less polymer wall material to deliver the same amount of benefit agent. Further, because the delivery particles have relatively high loading of benefit agent, less delivery particle material may be required for a particular composition, saving cost and/or freeing up formulation space.

The delivery particles of the present disclosure may be characterized by a core-to-polymer-wall weight ratio (also "core:polymer wall weight ratio," or even "C:W ratio" and the like, as used herein). Relatively high core:polymer wall ratios are typically preferred to increase the delivery efficiency or relatively payload of the delivery particles. However, if the ratio is too high, then the delivery particle may become too brittle or leaky and provide suboptimal performance.

As used herein, the core:polymer wall weight ratio is be understood as calculated on the basis of the weight of the reacted polymer wall-forming materials and initiators that constitute the polymer wall, and for purposes of the calculation excludes in the calculation entrapped nonstructural materials, such as entrapped emulsifier. The calculation is based the amounts of the starting inputs, namely the input monomers and initiators.

A delivery particle, optionally the population of delivery particles, may be characterized by a core:polymer wall weight ratio of at least about 96:4, optionally at least about 97:3, optionally at least about 98:2, optionally at least about 99:1. A delivery particle, optionally the population of delivery particles, may be characterized by a core-to-polymer-wall weight ratio of from about 96:4 to about 99.5:0.5, optionally from about 96:4 to about 99:1, optionally from about 97:3 to about 99:1, optionally from about 98:2 to about 99:1. The core-to-polymer-wall weight ratio may be from about 96:4 to about 99:1, or from about 96:4 to about 98:2, or from about 97:3 to about 98:2.

Components and processes related to the delivery particles of the present disclosure are described in more detail below.

a. Polymer Wall

The delivery particles of the present disclosure include a polymer wall that surrounds a core.

The polymer wall comprises a polymeric material, specifically a (meth)acrylate polymer. The (meth)acrylate polymer is derived, at least in part, from one or more oil-soluble or oil-dispersible multifunctional (meth)acrylate monomers or oligomers.

The polymer wall may comprise from about 5% to about 100%, optionally from about 40% to about 100%, more optionally from about 50% to about 100%, optionally from about 75% to about 100%, optionally from about 85% to about 100%, optionally from about 90% to about 100%, optionally from about 95% to about 100%, by weight of the polymer wall, of the (meth)acrylate polymer. The polymer wall may comprise from about 5% to about 100%, optionally from about 40% to about 100%, more optionally from about 50% to about 100%, more optionally from about 75% to about 100%, more optionally from about 85% to about 100%, more optionally from about 90% to about 100%, even more optionally from about 95% to about 100%, by weight of the polymer wall, of the oil-soluble or oil-dispersible multifunctional (meth)acrylate monomer or oligomer. The (meth)acrylate polymer may comprise from about 5% to about 100%, optionally from about 40% to about 100%, optionally from about 50% to about 100%, optionally from about 75% to about 100%, optionally from about 85% to about 100%, optionally from about 90% to about 100%, optionally from about 95% to about 100%, by weight of the (meth)acrylate polymer, of the oil-soluble or oil-dispersible multifunctional (meth)acrylate monomer or oligomer.

The one or more oil-soluble or oil-dispersible multifunctional (meth)acrylate monomers or oligomers comprise at least three, optionally at least four, optionally at least five, optionally at least six, optionally exactly six, radical polymerizable functional groups, with the proviso that at least one of the radical polymerizable functional groups is an acrylate or methacrylate group.

The one or more oil-soluble or oil-dispersible multifunctional (meth)acrylate monomers or oligomers may comprise from three to six, optionally from four to six, optionally from five to six, optionally six, radical polymerizable functional groups. It is believed that monomers comprising a relatively greater number of radical polymerizable groups result in, for example, delivery particles having more compact polymer walls and having preferred properties, such as less leakage, compared to polymer walls formed from monomers that have fewer radical polymerizable groups.

The radical polymerizable functional groups may be independently selected from the group consisting of acrylate, methacrylate, styrene, allyl, vinyl, glycidyl, ether, epoxy, carboxyl, or hydroxyl, with the proviso that at least one of the radical polymerizable groups is acrylate or methacrylate. Optionally, at least two, or at least three, or at least four, or at least five, or at least six of the radical polymerizable functional groups is an acrylate or methacrylate group. Optionally, the radical polymerizable functional groups are each independently selected from the group consisting of acrylate and methacrylate. It is believed that these functional groups result in delivery particles having beneficial properties, such as less leakage at high core: polymer wall ratios, compared to other functional groups.

The oil-soluble or oil-dispersible multifunctional (meth) acrylate monomers or oligomers may comprise a multifunctional aromatic urethane acrylate. Optionally, the oil-soluble or oil-dispersible multifunctional (meth)acrylate monomers or oligomers comprise a hexafunctional aromatic urethane acrylate.

Additionally or alternatively, the oil-soluble or oil-dispersible multifunctional (meth)acrylate monomers or oligomers may comprise a multifunctional aliphatic urethane acrylate.

The (meth)acrylate polymer of the polymer wall may be derived from at least two different multifunctional (meth) acrylate monomers, for example first and second multifunctional (meth)acrylate monomers, each of which may optionally be oil-soluble or oil-dispersible. The first multifunctional (meth)acrylate monomer may comprise a different number of radical polymerizable functional groups compared to the second multifunctional (meth)acrylate monomer. For example, the first multifunctional (meth) acrylate monomer may comprise six radical polymerizable functional groups (e.g., hexafunctional), and the second multifunctional (meth)acrylate monomer may comprise less than six radical polymerizable functional groups, such as a number selected from three (e.g., trifunctional), four (e.g., tetrafunctional), or five (e.g., pentafunctional), optionally five. The first and second multifunctional (meth)acrylate monomers may be comprise the same number of radical polymerizable functional groups, such as six (e.g., both monomers are hexafunctional), although the respective monomers are characterized by different structures or chemistries.

The oil-soluble or oil-dispersible (meth)acrylate may further comprise a monomer selected from an amine methacrylate, an acidic methacrylate, or a combination thereof.

The (meth)acrylate polymer of the polymer wall may be a reaction product derived from the oil-soluble or oil-dispersible multifunctional (meth)acrylate, a second monomer, and a third monomer. Preferably, the second monomer comprises a basic (meth)acrylate monomer, and the third monomer comprises an acidic (meth)acrylate monomer. The basic (meth)acrylate monomer or oligomer may be present at less than 2% by weight of the polymer wall. The acidic (meth)acrylate monomer or oligomer may be present at less than 2% by weight of the polymer wall.

The basic (meth)acrylate monomer, and/or oligomer or prepolymers thereof, may comprise one or more of an amine modified methacrylate, amine modified acrylate, a monomer such as mono or diacrylate amine, mono or dimethacrylate amine, amine modified polyether acrylate, amine modified polyether methacrylate, aminoalkyl acrylate, or aminoalkyl methacrylate. The amines can be primary, secondary or tertiary amines. Optionally the alkyl moieties of the basic (meth)acrylate monomer are C1 to C12.

Suitable amine (meth)acrylates for use in the delivery particles of the present disclosure may include aminoalkyl acrylate or aminoalkyl methacrylate including, for example, but not by way of limitation, ethylaminoethyl acrylate, ethylaminoethyl methacrylate, aminoethyl acrylate, aminoethyl methacrylate, tertiarybutyl ethylamino acrylate, tertiarybutyl ethylamino methacrylate, tertiarybutyl aminoethyl acrylate, tertiarybutyl aminoethyl methacrylate, diethylamino acrylate, diethylamino methacrylate, diethylaminoethyl acrylate diethylaminoethyl methacrylate, dimethylaminoethyl acrylate and dimethylaminoethyl methacrylate. Optionally, the amine (meth)acrylate is aminoethyl acrylate or aminoethyl methacrylate, or tertiarybutyl aminoethyl methacrylate.

The acidic (meth)acrylate may comprise, by way of illustration, one or more of carboxy substituted acrylates or methacrylates, preferably carboxy substituted alkyl acrylates or methacrylates, such as carboxyalkyl acrylate, carboxyalkyl methacrylate, carboxyaryl acrylate, carboxy aryl methacrylate, and preferably the alky moieties are straight chain or branched C1 to C10. The carboxyl moiety can be bonded to any carbon of the C1 to C10 alkyl moiety, preferably a terminal carbon. Carboxy substituted aryl acrylates or methacrylates can also be used, or even (meth) acryloyloxyphenylalkylcarboxy acids. The alkyl moieties of the (meth)acryloyloxyphenylalkylcarboxy acids can be C1 to C10.

Suitable carboxy (meth)acrylates for use in delivery particles of the present disclosure may include 2-carboxyethyl acrylate, 2-carboxyethyl methacrylate, 2-carboxypropyl acrylate, 2-carboxypropyl methacrylate, carboxyoctyl acrylate, carboxyoctyl methacrylate. Carboxy substituted aryl acrylates or methacrylates may include 2-acryloyloxybenzoic acid, 3-acryloyloxybenzoic acid, 4-acryloyloxybenzoic acid, 2-methacryloyloxybenzoic acid, 3-methacryloyloxybenzoic acid, and 4-methacryloyloxybenzoic acid. (Meth) acryloyloxyphenylalkylcarboxy acids by way of illustration and not limitation can include 4-acryloyloxyphenylacetic acid or 4-methacryloyloxyphenylacetic acid.

In addition to the oil-soluble or oil-dispersible multifunctional (meth)acrylate monomer or oligomer, the (meth) acrylate polymer of the polymer wall may be further derived from a water-soluble or water-dispersible mono- or multifunctional (meth)acrylate monomer or oligomer, which may include a hydrophilic functional group. The water-soluble or water-dispersible mono- or multifunctional (meth)acrylate monomer or oligomer may be preferably selected from the group consisting of amine (meth)acrylates, acidic (meth) acrylates, polyethylene glycol di(meth)acrylates, ethoxylated monofunctional (meth)acrylates, ethoxylated multifunctional (meth)acrylates, other (meth)acrylate monomers, other (meth)acrylate oligomers, and mixtures thereof. When making the delivery particle, optionally emulsifier may be included, preferably in the water phase. The emulsifier may be a polymeric emulsifier. Emulsifier can help with further stabilizing the emulsion. In formation of the polymer wall of the delivery particle, the polymeric emulsifier can become entrapped in the polymer wall material. These inclusions of emulsifier into the polymer wall usefully can be used to advantage in modification of polymer wall properties, influencing such attributes as flexibility, leakage, strength, and other properties. Thus, the polymer wall of the delivery particles may further comprise a polymeric emulsifier entrapped in the polymer wall, optionally wherein the polymeric emulsifier comprises polyvinyl alcohol. As indicated above, however, the entrapped polymeric emulsifier is not to be included when determining the core polymer wall weight ratio.

The benefit agent delivery particle may comprise from about 0.5% to about 40%, preferably from about 0.5% to about 20%, more preferably 0.8% to 5% of an emulsifier, based on the weight of the polymer wall material. Optionally, the emulsifier is selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water. The emulsifier optionally comprises polyvinyl alcohol, and the polyvinyl alcohol optionally has a hydrolysis degree from about 55% to about 99%, optionally from about 75% to about 95%, optionally from about 85% to about 90% and optionally from about 87% to about 89%. The polyvinyl alcohol may have a viscosity of from about 40 cps to about 80 cps, optionally from about 45 cps to about 72 cps, optionally from about 45 cps to about 60 cps and optionally 45 cps to 55 cps in an aqueous 4% polyvinyl alcohol solution at 20° C.; the viscosity of a polymer is determined by measuring a freshly made solution using a Brookfield LV type viscometer with UL adapter as described in British Standard EN ISO 15023-2:2006 Annex E Brookfield Test method. The polyvinyl alcohol may have a degree of polymerization of from about 1500 to about 2500, optionally from about 1600 to about 2200, optionally from about 1600 to about 1900 and optionally from about 1600 to about 1800. The weight average molecular weight of the polyvinyl alcohol may be of from about 130,000 to about 204,000 Daltons, optionally from about 146,000 to about 186,000, optionally from about 146,000 to about 160,000, and optionally from about 146,000 to about 155,000, and/or has a number average molecular weight of from about 65,000 to about 110,000 Daltons, optionally from about 70,000 to about 101,000, optionally from about 70,000 to about 90,000 and optionally from about 70,000 to about 80,000.

The (meth)acrylate polymer of the polymer wall may be further derived, at least in part, from at least one free radical initiator, preferably at least two free radical initiators. The at least one free radical initiator may preferably comprise a water-soluble or water-dispersible free radical initiator. One or more free radical initiators can provide a source of free radicals upon activation.

The amount of initiator present may be from about 2% to about 50%, optionally from about 5% to about 40%, optionally from about 10% to about 40%, optionally from about 15% to about 40%, optionally from about 20% to about 35%, or optionally from about 20% to about 30%, by weight of the polymer wall (e.g., polymer wall monomers plus initiators, excluding embedded polymeric emulsifiers, as described herein for core:polymer wall ratios). It is believed that relatively higher amounts of initiator within the disclosed ranges may lead to improved, less-leaky delivery particles. The optimal amount of initiator may vary according to the nature of the core material. The (meth)acrylate polymer of the polymer wall may be derived from a first initiator and a second initiator, wherein the first and second initiators are present in a weight ratio of from about 5:1 to about 1:5, or optionally from about 3:1 to about 1:3, or optionally from about 2:1 to about 1:2, or optionally from about 1.5:1 to about 1:1.5.

Suitable free radical initiators may include peroxy initiators, azo initiators, peroxides, and compounds such as 2,2'-azobismethylbutyronitrile, dibenzoyl peroxide. More particularly, and without limitation, the free radical initiator can be selected from the group of initiators comprising an azo or peroxy initiator, such as peroxide, dialkyl peroxide, alkylperoxide, peroxyester, peroxycarbonate, peroxyketone and peroxydicarbonate, 2,2'-azobis (isobutylnitrile), 2,2'-azobis (2,4-dimethylpentanenitrile), 2,2'-azobis (2,4-dimethylvaleronitrile), 2,2'-azobis(2-methylpropanenitrile), 2,2'-azobis (2-methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl) peroxydicarbonate, di(2-ethylhexyl)peroxydicarbonate, 1,1-dimethyl-3-hydroxybutyl peroxyneodecanoate, a-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, dit-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like.

The polymer wall of the delivery particles may comprise a coating, for example on an outer surface of the polymer wall, away from the core. The delivery particles may be manufactured and be subsequently coated with a coating material. The coating may be useful as a deposition aid. The coating may comprise a cationic material, such as a cationic polymer. As indicated above, however, a coating that is not a structural or support feature of the polymer wall is not to be included in calculations when determining the core: polymer wall weight ratio.

Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise polyvinyl formamide, chitosan, or combinations thereof, preferably chitosan.

b. Benefit Agent

The delivery particles of the present disclosure include a core. The core may comprise a benefit agent. Suitable benefit agents located in the core may include benefit agents that provide benefits to a surface, such as a fabric.

The core may comprise from about 45% to about 95%, optionally from about 50% to about 80%, optionally from about 50% to about 70%, by weight of the core, of the benefit agent, which may optionally be a fragrance.

The benefit agent may be selected from the group consisting of fragrance, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes, and mixtures thereof.

The benefit agent may optionally be a fragrance, which may include one or more perfume raw materials. The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The fragrance may comprise perfume raw materials that have a log P of from about 2.5 to about 4. It is understood that other perfume raw materials may also be present in the fragrance.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are optionally limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

c. Partitioning Modifier

The core of the delivery particles of the present disclosure may comprise a partitioning modifier. The properties of the oily material in the core can play a role in determining how much, how quickly, and/or how permeable the polyacrylate polymer wall material will be when established at the oil/water interface. For example, if the oil phase comprises highly polar materials, these materials may reduce the diffusion of the acrylate oligomers and polymers to the oil/water interface and result in a very thin, highly permeable polymer wall. Incorporation of a partitioning modifier can adjust the polarity of the core, thereby changing the partition coefficient of the polar materials in the partitioning modifier versus the acrylate oligomers, and can result in the establishment of a well-defined, highly impermeable polymer wall. The partitioning modifier may be combined with the core's perfume oil material prior to incorporation of the polymer wall-forming monomers.

The partitioning modifier may be present in the core at a level of from about 5% to about 55%, optionally from about 10% to about 50%, optionally from about 25% to about 50%, by weight of the core.

The partitioning modifier may comprise a material selected from the group consisting of vegetable oil, modified vegetable oil, mono-, di-, and tri-esters of $C_4$-$C_{14}$ fatty acids, isopropyl myristate, dodecanophenone, lauryl laurate, methyl behenate, methyl laurate, methyl palmitate, methyl stearate, and mixtures thereof. The partitioning modifier may optionally comprise or even consist of isopropyl myristate. The modified vegetable oil may be esterified and/or brominated. The modified vegetable oil may optionally comprise castor oil and/or soy bean oil. US Patent Application Publication 20110268802, incorporated herein by reference, describes other partitioning modifiers that may be useful in the presently described delivery particles.

d. Method of Making Delivery Particles

Delivery particles may be made following the teaching of US20230120922A1. Delivery particles may be made according to known methods, so long as the core:polymer wall ratios described herein are observed. Methods may be further adjusted to arrive at other desirable characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more oil-soluble or dispersible multifunctional (meth)acrylate monomers or oligomers having at least three, and optionally at least four, at least five, or even at least six radical polymerizable functional groups with the proviso that at least one of the radical polymerizable groups is acrylate or methacrylate.

The oil-soluble or dispersible multifunctional (meth)acrylate monomers or oligomers are described in more detail above. Among other things, the oil-soluble or dispersible multifunctional (meth)acrylate monomers or oligomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer or oligomer may comprise one or more multifunctional aliphatic urethane acrylates, which may be dissolved or dispersed into the oil phase. The process may further comprise dissolving or dispersing one or more of an amine (meth) acrylate or an acidic (meth)acrylate into the oil phase.

The process may further comprise providing a water phase, which may comprise an emulsifier, a surfactant, or a combination thereof. The process may further comprise the step of dissolving or dispersing into the water phase one or more water-soluble or water-dispersible mono- or multi-functional (meth)acrylate monomers and/or oligomers.

The process may comprising a step of dissolving or dispersing in into the water phase, the oil phases, or both, of one or more amine (meth)acrylates, acidic (meth)acrylates, polyethylene glycol di(meth)acrylates, ethoxylated mono- or multi-functional (meth)acrylates, and/or other (meth) acrylate monomers and/or oligomers.

In general, the oil soluble multifunctional (meth)acrylate monomer is soluble or dispersible in the oil phase, typically soluble at least to the extent of 1 gram in 100 ml of the oil, or dispersible or emulsifiable therein at 22 C. The water soluble multifunctional (meth)acrylate monomers are typically soluble or dispersible in water, typically soluble at least to the extent of 1 gram in 100 ml of water, or dispersible therein at 22 C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished delivery particles.

The dissolved or dispersed monomers may be reacted by heating or actinic irradiation of the emulsion. The reaction can form a polymer wall at an interface of the droplets and the water phase. The radical polymerizable groups of the multifunctional methacrylate, upon heating, facilitate self-polymerization of the multifunctional methacrylate.

One or more free radical initiators may be provided to the oil phase, the water phase, or both the oil phase and the water phase. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

Alternatively, the reacting step may be carried out in the absence of an initiator, as it has surprisingly been found that delivery particles may form, even when a free radical initiator is not present.

In the described process, the heating step may comprise heating the emulsion from about 1 hour to about 20 hours, optionally from about 2 hours to about 15 hours, optionally about 4 hours to about 10 hours, optionally from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, optionally from about 30 microns to about 50 microns, with a view to forming a population of delivery particles with a volume-weighted target size, for example, of from about 30 to about 50 microns.

The benefit agent may be selected as described above, and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 55% by weight of the core of the delivery particle.

As described above, it is desirable for the resulting delivery particles to be characterized by a core to polymer wall weight of from 96:4 to about 99.5:0.5. It is also desirable for the resulting delivery particles to be characterized by a volume-weighted median particle size of from about 30 to about 50 microns.

As a result of the method of making delivery particles provided herein, the delivery particles may be present in an aqueous slurry, for example, the delivery particles may be present in the slurry at a level of from about 20% to about 60%, preferably from about 30% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

e. Volume-Weighted Particle Size and Size Distribution

The volume-weighted delivery particle size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery particles in suspension is introduced, and its density of delivery particles adjusted with DI water as necessary via autodilution to result in delivery particles counts of at least 9200 per ml. During a time period of 60 seconds the suspension is analyzed. The resulting volume-weighted PSD data are plotted and recorded, and the values of the desired volume-weighted particle size (e.g., the median/50' percentile, 5' percentile, and/or $90^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

$$\text{Broadness Index} = ((90\%\ \text{size}) - (5\%\ \text{size}))/50\%\ \text{size}.$$

Process of Manufacture

The dryer sheet can be practically formed using a continuous web converting process. A nonwoven fibrous substrate can be provided. A melt of the fabric softener composition can be applied to the nonwoven fibrous substrate. The melt can cool and solidify so as to be carried on, within, or a combination of on and within the nonwoven fibrous substrate. The fabric softener composition can be positioned, at least partially or entirely, in the interstitial spaces amongst the fibers constituting the nonwoven fibrous substrate.

The melt of fabric softener composition can be applied to the nonwoven fibrous substrate by slot coating, spray coating, kiss rolling, printing, rotogravure, and other processes for applying the fabric softener composition as a melt. One practical approach for applying fabric softener composition to a nonwoven fibrous substrate is to slot coat the nonwoven fibrous substrate and use a scraper set at or just above the nonwoven fibrous substrate to scrape off fabric softener composition at some level at or above the surface of the nonwoven fibrous substrate so that excess fabric softener composition is removed.

A drawing of a dryer sheet 10 comprising a nonwoven fibrous substrate 20 and a fabric softener composition 30 is shown in FIG. 1.

Combinations

A. A dryer sheet comprising:
- a nonwoven fibrous substrate;
- a fabric softener composition engaged with said nonwoven fibrous layer, wherein said fabric softener composition comprises:
- a fabric softening active;
- a clay; and
- delivery particles comprising a core and a polymer wall surrounding said core;
- wherein said core comprises:
- a benefit agent; and
- about 5% to about 55% partitioning modifier by weight of said of core;
- wherein said polymer wall comprises a (meth)acrylate polymer derived, at least in part, from one or more oil-soluble or oil-dispersible multifunctional (meth) acrylate monomers or oligomers, said one or more oil-soluble or oil-dispersible multifunctional (meth) acrylate monomers or oligomers having at least three radical polymerizable functional groups, wherein at least one of said radical polymerizable groups is acrylate or methacrylate, wherein said core and said polymer wall are present at a weight ratio of from about 96:4 to about 99.5:0.5; and wherein said delivery particles are characterized by a volume-weighted median particle size from about 30 to about 50 microns.

B. The dryer sheet according to Paragraph A, wherein said clay is bentonite.

C. The dryer sheet according to Paragraph A or B, wherein said fabric softener composition comprises from about 6% to about 10%, by weight of said fabric softener composition, said clay.

D. The dryer sheet according to any of Paragraphs A to C, wherein said fabric softener composition comprises from about 50% to about 65%, by weight of said fabric softener composition, said fabric softening active.

E. The dryer sheet according to any of Paragraphs A to D, wherein said fabric softener composition comprises from about 0.2% to about 2%, by weight of said fabric softener composition, said delivery particles.

F. The dryer sheet according to any of Paragraphs A to E, wherein said fabric softening active is a quaternary ammonium compound.

G. The dryer sheet according to any of Paragraphs A to F, wherein said fabric softening active is selected from: di tallow dimethyl ammonium methyl sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di(2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri(oleyl-oxy-ethyl)-N-methyl ammonium chloride, N,N,N-tri(canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof.

H. The dryer sheet according to any of Paragraphs A to F, wherein said fabric conditioning active is N,N-di(tallowyl-oxy-ethyl)-N-methyl, N-(2-hydroxyethyl) ammonium methyl sulfate.

I. The dryer sheet according to any of Paragraphs A to E, wherein said fabric softening active comprises a branched polyester having a formula of:

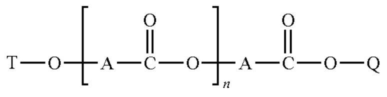

wherein:

each A is independently a branched hydrocarbon chain comprising 4 to 100 carbon atoms;

Q is selected from an alkyl chain comprising 1 to 30 carbon atoms and a hydrogen atom;

T is a hydrogen atom or a —C(O)—R wherein each R is an alkyl chain comprising 1 to 30 carbon atoms and n is an integer from 1 to about 100.

J. The dryer sheet according to Paragraph I, wherein:

each A is independently a branched hydrocarbon chain comprising from 4 to 40 carbon atoms;

Q is selected from an alkyl chain comprising 1 to 30 carbon atoms and a hydrogen atom;

T is a hydrogen atom or a —C(O)—R wherein each R is an alkyl chain comprising from 7 to 21 carbon atoms; and n is an integer from 4 to 40.

K. The dryer sheet according to Paragraph I or J, wherein said branched polyester polymer has a weight average molecular weight of from about 500 g/mol to about 100,000 g/mol.

L. The dryer sheet according to any of Paragraphs I to K, wherein each A of said polyester polymers is independently a branched hydrocarbon having the structure

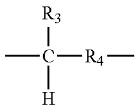

wherein each $R_3$ is a monovalent alkyl or substituted alkyl group and $R_4$ is an unsaturated or saturated divalent alkylene radical comprising from 1 to about 24 carbon atoms.

M. The dryer sheet according to Paragraph I, wherein each A of said polyester polymers has the structure:

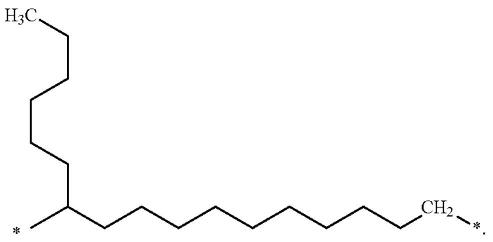

N. The dryer sheet according to any of Paragraphs I to M, wherein said branched polyester polymer has an iodine value from about 0 to about 90.

O. The dryer sheet according to any of Paragraphs A to N, wherein said delivery particles comprise said core and said polymer wall at a weight ratio of from about 97:3 to about 99:1.

P. The dryer sheet according to any of Paragraphs A to O, wherein said one or more oil-soluble or dispersible multi-functional (meth)acrylate monomers or oligomers comprise at least four radical polymerizable functional groups.

Q. The dryer sheet according to Paragraph P, wherein said radical polymerizable functional groups are each independently selected from acrylate and methacrylate.

R. The dryer sheet according to any of Paragraphs A to Q, wherein said oil-soluble or oil-dispersible multifunctional (meth)acrylate monomers or oligomers comprise a multi-functional aromatic urethane acrylate.

S. The dryer sheet according to any of Paragraphs A to R, wherein said oil-soluble or oil-dispersible multifunctional (meth)acrylate monomers or oligomers comprise a hexa-functional aromatic urethane acrylate.

T. The dryer sheet to any of Paragraphs A to S, wherein said oil-soluble or oil-dispersible multifunctional (meth) acrylate monomers or oligomers comprise a multifunctional aliphatic urethane acrylate.

U. The dryer sheet according to any of Paragraphs A to T, wherein said (meth)acrylate polymer is further derived from, at least in part, a monomer selected from an amine methacrylate, an acidic methacrylate, or a combination thereof.

V. The dryer sheet according to any of Paragraphs A to U, wherein said (meth)acrylate polymer of the polymer wall is a reaction product derived from said oil-soluble or oil-dispersible multifunctional (meth)acrylate, a second monomer, and a third monomer.

W. The dryer sheet according to any of Paragraphs A to V, wherein said (meth)acrylate polymer of the polymer wall is further derived from a water-soluble or water-dispersible mono- or multifunctional (meth)acrylate monomer or oligomer.

X. The dryer sheet according to any of Paragraphs A to W, wherein said polymer wall of the delivery particles further comprise a polymeric emulsifier entrapped in said polymer wall.

Y. The dryer sheet according to any of Paragraphs A to X, wherein said (meth)acrylate polymer of the polymer wall is further derived, at least in part, from at least one free radical initiator.

Z. The dryer sheet according to Paragraph Y, wherein said free radical initiator is present in amount of from about 2% to about 50%, by weight of said polymer wall.

AA. The dryer sheet according to any of Paragraphs A to Z, wherein the benefit agent is a fragrance.

BB. The dryer sheet according to any of Paragraphs A to AA, wherein said partitioning modifier is selected from isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof.

CC. The dryer sheet according to any of Paragraphs A to BB, wherein said polymer wall of said delivery particles further comprises a coating material.

DD. The dryer sheet according to any of Paragraphs A to CC, wherein said delivery particles are characterized by a volume-weighted median particle size from about 30 to about 40 microns.

EE. The dryer sheet according to any of Paragraphs A to DD, wherein said fabric softener composition comprises from about 0.05% to about 20%, by weight of said fabric softener composition, of the delivery particles.

FF. The dryer sheet according to any of Paragraphs A to EE, wherein said fabric softener composition comprises from about 25% to about 35%, by weight of said fabric softener composition, fatty acid.

GG. The dryer sheet according to any of Paragraphs A to FF, wherein said fabric softener composition comprises from about 0.1% to about 5%, by weight of said fabric softener composition, unencapsulated perfume.

HH. A process for making the dryer sheet according to any of Paragraphs A to GG comprising the steps of:
- providing said nonwoven fibrous substrate;
- providing a melt of said fabric softener composition; and
- applying said melt of said fabric softener composition to said nonwoven fibrous substrate.

I. A process for making a dryer sheet comprising the steps of:
- providing a nonwoven fibrous substrate;
- providing a melt of fabric softener composition; and
- applying said melt of said fabric softener composition to said nonwoven fibrous substrate;
- wherein said fabric softener composition comprises:
- a fabric softening composition;
- a clay; and
- delivery particles comprising a core and a polymer wall surrounding said core;
- wherein said core comprises:
- a benefit agent; and
- about 5% to about 55% partitioning modifier by weight of said of core;
- wherein said polymer wall comprises a (meth)acrylate polymer derived, at least in part, from one or more oil-soluble or oil-dispersible multifunctional (meth) acrylate monomers or oligomers, said one or more oil-soluble or oil-dispersible multifunctional (meth) acrylate monomers or oligomers having at least three radical polymerizable functional groups, wherein at least one of said radical polymerizable groups is acrylate or methacrylate, wherein said core and said polymer wall are present at a weight ratio of from about 96:4 to about 99.5:0.5; and wherein said delivery particles are characterized by a volume-weighted median particle size from about 30 to about 50 microns.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dryer sheet comprising:
- a nonwoven fibrous substrate;
- a fabric softener composition engaged with said nonwoven fibrous layer, wherein said fabric softener composition comprises:
  - a fabric softening active;
  - a clay; and
  - delivery particles comprising a core and a polymer wall surrounding said core;
- wherein said core comprises:
  - a benefit agent; and
  - about 5% to about 55% partitioning modifier by weight of said of core;
- wherein said polymer wall comprises a (meth)acrylate polymer derived, at least in part, from one or more oil-soluble or oil-dispersible multifunctional (meth) acrylate monomers or oligomers, said one or more oil-soluble or oil-dispersible multifunctional (meth) acrylate monomers or oligomers having at least three radical polymerizable functional groups, wherein at least one of said radical polymerizable groups is acrylate or methacrylate, wherein said core and said polymer wall are present at a weight ratio of from about 96:4 to about 99.5:0.5;
- wherein said fabric softener composition comprises from about 50% to about 65%, by weight of said fabric softener composition, said fabric softening active; and
- wherein said delivery particles are characterized by a volume-weighted median particle size from about 30 to about 50 microns.

2. The dryer sheet according to claim 1, wherein said clay is bentonite.

3. The dryer sheet according to claim 1, wherein said fabric softener composition comprises from about 6% to about 10%, by weight of said fabric softener composition, said clay.

4. The dryer sheet according to claim 1, wherein said fabric softener composition comprises from about 0.2% to about 2%, by weight of said fabric softener composition, said delivery particles.

5. The dryer sheet according to claim 1, wherein said fabric softening active is a quaternary ammonium compound.

6. The dryer sheet according to claim 1, wherein said fabric softening active is selected from: di tallow dimethyl ammonium methyl sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di(2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri (oleyl-oxy-ethyl)-N-methyl ammonium chloride, N,N,N-tri (canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof.

7. The dryer sheet according to claim 1, wherein said fabric softening active is N,N-di(tallowyl-oxy-ethyl)-N-methyl, N-(2-hydroxyethyl) ammonium methyl sulfate.

8. The dryer sheet according to claim 1, wherein said delivery particles comprise said core and said polymer wall at a weight ratio of from about 97:3 to about 99:1.

9. The dryer sheet according to claim 1, wherein said fabric softening active comprises a branched polyester having a formula of:

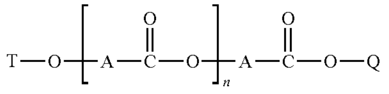

wherein:

each A is independently a branched hydrocarbon chain comprising 4 to 100 carbon atoms;

Q is selected from an alkyl chain comprising 1 to 30 carbon atoms and a hydrogen atom;

T is a hydrogen atom or a —C(O)—R wherein each R is an alkyl chain comprising 1 to 30 carbon atoms and n is an integer from 1 to about 100.

10. The dryer sheet according to claim 9, wherein:

each A is independently a branched hydrocarbon chain comprising from 4 to 40 carbon atoms;

Q is selected from an alkyl chain comprising 1 to 30 carbon atoms and a hydrogen atom;

T is a hydrogen atom or a —C(O)—R wherein each R is an alkyl chain comprising from 7 to 21 carbon atoms; and n is an integer from 4 to 40.

11. The dryer sheet according to claim 10, wherein each A of said polyester polymers is independently a branched hydrocarbon having the structure

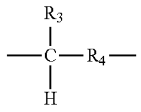

wherein each $R_3$ is a monovalent alkyl or substituted alkyl group and $R_4$ is an unsaturated or saturated divalent alkylene radical comprising from 1 to about 24 carbon atoms.

12. The dryer sheet according to claim 9, wherein each A of said polyester polymers has the structure:

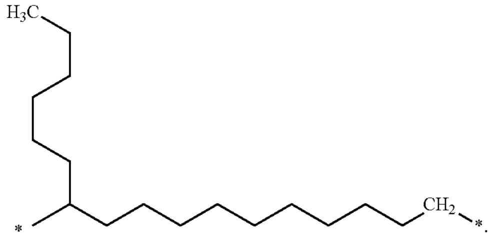

13. The dryer sheet according to claim 1, wherein said benefit agent is a fragrance.

14. The dryer sheet according to claim 1, wherein said partitioning modifier is selected from isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof.

15. The dryer sheet according to claim 1, wherein said delivery particles are characterized by a volume-weighted median particle size from about 30 to about 40 microns.

16. The dryer sheet according to claim 1, wherein said fabric softener composition comprises from about 0.05% to about 20%, by weight of said fabric softener composition, said delivery particles.

17. The dryer sheet according to claim 1, wherein said fabric softener composition comprises from about 25% to about 35%, by weight of said fabric softener composition, fatty acid.

18. The dryer sheet according to claim 1, wherein said fabric softener composition comprises from about 0.1% to about 5%, by weight of said fabric softener composition, unencapsulated perfume.

19. A process for making the dryer sheet according to claim 1 comprising the steps of:

providing said nonwoven fibrous substrate;

providing a melt of said fabric softener composition; and applying said melt of said fabric softener composition to said nonwoven fibrous substrate.

* * * * *